No. 700,512. Patented May 20, 1902.
C. KRAUSS & R. M. VON BERNECK.
PROCESS OF MAKING SULFURIC ACID AND SULFUR ANHYDRID.
(Application filed Mar. 6, 1902.)
(No Model.)
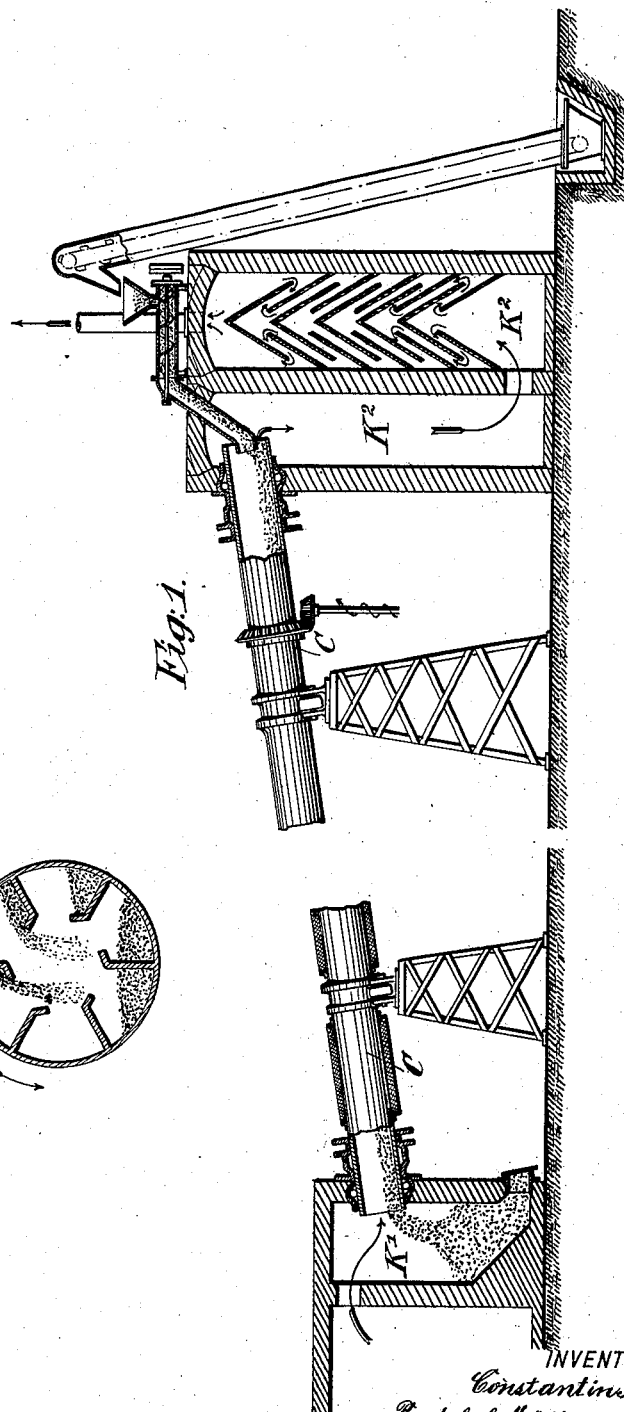
WITNESSES:
INVENTORS
Constantin Krauss,
Rudolph Müller von Berneck.
BY
ATTORNEYS

UNITED STATES PATENT OFFICE.

CONSTANTIN KRAUSS AND RUDOLPH MÜLLER VON BERNECK, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

PROCESS OF MAKING SULFURIC ACID AND SULFUR ANHYDRID.

SPECIFICATION forming part of Letters Patent No. 700,512, dated May 20, 1902.

Application filed March 6, 1902. Serial No. 96,921. (No specimens.)

*To all whom it may concern:*

Be it known that we, CONSTANTIN KRAUSS, Ph. D., and RUDOLPH MÜLLER VON BERNECK, chemist, citizens of the Empire of Germany, residing at Höchst-on-the-Main, Germany, have invented certain new and useful Improvements in Processes of Making Sulfuric Acid and Sulfur Anhydrid, of which the following is a specification.

It is known that ferric oxid, like platinum, may be used as a catalytic agent or contact substance for effecting the combination of sulfur dioxid and oxygen to form sulfuric anhydrid. For this purpose the gases from a pyrites-burner may be led over red-hot burnt pyrites. It is also known that the still unoxidized sulfur in burnt pyrites may be oxidized if the burnt pyrites is exposed to the direct action of the hot gases from the pyrites-burner.

The present invention relates to improvements in the manufacture of sulfuric anhydrid and sulfuric acid or of the former alone by bringing pyrites-burner gases or like mixture of gases into contact with burnt pyrites or like oxid of iron, one result of which improvements is that the unoxidized sulfur in the burnt pyrites is oxidized and separated.

From our experiments it appears that when dry pyrites-burner gases are passed over burnt pyrites at a comparatively low temperature sulfur dioxid disappears from the gases without formation of an equivalent of sulfuric anhydrid, being presumably fixed by the burnt pyrites. This phenomenon is more marked when the burnt pyrites has been previously impregnated with ferrous sulfate. When the temperature of the burnt pyrites is raised, both the sulfuric anhydrid and sulfur dioxid in the gases passing away from the apparatus increase. At still higher temperatures the burnt pyrites begins to act catalytically, and then, as we have discovered, the action is notably enhanced if the burnt pyrites has been previously impregnated with ferrous sulfate. We have also observed that the fixation of sulfur dioxid by the burnt pyrites at the low temperature is better, and the oxidation of the unoxidized sulfur in the burnt pyrites is better if the gases to be combined contained a small quantity of moisture. Our invention consists in applying these observations by exposing the burnt pyrites to pyrites-burner gases or other mixture of gases containing sulfur dioxid and oxygen, first at a comparatively low temperature—say about 350° centigrade—and then at higher temperatures, preferably finally attaining some 550 to 650° centigrade. For instance, the hot undried gases leaving the furnace or burner or otherwise obtained are directly passed through a channel wherein burnt pyrites is made to meet the current of gas. The burnt pyrites is preferably saturated previously with ferrous sulfate. In this manner the gases are gradually cooled to the said low temperature, while the burnt pyrites is gradually heated to the said high temperature, so that there is an uninterrupted delivery of sulfuric acid and anhydrid at one end of the channel and of completely burnt pyrites at the other end.

In the accompanying drawings, which illustrate an apparatus suitable for carrying on our process, Figure 1 is a side elevation with parts in vertical longitudinal section, and Fig. 2 is a vertical transverse section through the cylinder.

This apparatus for the manufacture by our invention consists of an inclined rotating cylinder C, which may have longitudinal internal ribs or shelves. Into the upper end of this cylinder the burnt pyrites, either in powder or coarse lumps, previously saturated with ferrous sulfate, is fed from a hopper, to which it is raised by a suitable conveyer. The hot gases from a pyrites-burner $K_1$ pass into the lower end of the cylinder, so that the descending material meets the ascending current of gradually-cooling gases until it drops from the lower end of the cylinder. At the upper and cooler part of the cylinder, which may here be externally cooled, if necessary, sulfur dioxid is fixed by the burnt pyrites. In the next and hotter zone the ferrous sulfate in the material is decomposed and the sulfuric anhydrid therefrom and from the sulfur dioxid fixed in the first zone is evolved.

In the third and hottest zone catalysis may occur, the gases being for this purpose conducted through a suitable chamber $K_2$.

Our invention is not limited to this form of apparatus, as others may be adopted for the manufacture by this process.

Although burnt pyrites has been spoken of as the contact substance, other form of ferric oxid may be used.

Having now described our invention, what we claim is—

The herein-described process of making sulfuric acid and sulfur anhydrid with simultaneous combustion of the unoxidized sulfur still contained in the burnt pyrites, which consists in bringing pyrites-burner gases at a low temperature into contact with burnt pyrites containing ferrous sulfate, whereby sulfur dioxid is fixed by the burnt pyrites and in then applying a higher temperature the fixed sulfur dioxid being again separated as sulfuric anhydrid, substantially as set forth.

In testimony that we claim the foregoing as our invention we have signed our names in presence of two subscribing witnesses.

CONSTANTIN KRAUSS.
RUDOLPH MÜLLER VON BERNECK.

Witnesses:
ALFRED BRISBOIS,
BERNHARD LEYDECKER.